United States Patent [19]

Jackovitz et al.

[11] Patent Number: 4,612,097

[45] Date of Patent: Sep. 16, 1986

[54] PROCESS FOR SEPARATION OF ZIRCONIUM ISOTOPES

[75] Inventors: John F. Jackovitz, Monroeville Boro; Steven H. Peterson, Murrysville, both of Pa.

[73] Assignee: Westinghouse Electric Corp., Pittsburgh, Pa.

[21] Appl. No.: 651,417

[22] Filed: Sep. 17, 1984

Related U.S. Application Data

[63] Continuation-in-part of Ser. No. 550,850, Nov. 14, 1983, abandoned.

[51] Int. Cl.$^4$ ............................................. B01J 19/12
[52] U.S. Cl. ................................................. 204/157.2
[58] Field of Search ...................... 204/157.1 R, 158 R

[56] References Cited

U.S. PATENT DOCUMENTS 4,389,292  6/1983  Phillips et al. .................. 204/158 R

FOREIGN PATENT DOCUMENTS 2491771  4/1982  France ............................ 204/158 R

*Primary Examiner*—Howard S. Williams
*Attorney, Agent, or Firm*—R. D. Fuerle

[57] ABSTRACT

The zirconium 91 isotopic content of zirconium is reduced by forming a solution of a zirconium compound and a scavenger of 8-hydroxyquinoline or its derivatives, and irradiating the solution with light at a wavelength which excites the compound so that it reacts with the scavenger. Because the molecules containing the zirconium 91 isotope remain excited longer, they react disproportionately with the scavenger. The reaction product, which precipitates from the solution, is therefore enriched in the zirconium 91 isotope. Micelle-forming agents can be added to the solution to enhance the isotopic enrichment.

17 Claims, No Drawings

PROCESS FOR SEPARATION OF ZIRCONIUM ISOTOPES

This application is a continuation-in-part of application Ser. No. 550,850, filed Nov. 14, 1983, now abandoned.

The use of zirconium for forming containers or fuel rod cladding for nuclear fuels is known. Zirconium exists as a mixture of isotopes; zirconium 90, zirconium 91, zirconium 92, zirconium 94 and zirconium 96, which isotopes are difficult to separate. The separation of the zirconium 91 isotope from the other isotopes is important, however, due to high absorption cross-section of this isotope for thermal neutrons as compared to the other isotopes of zirconium, and the advantages achieved by the use of a zirconium reduced or depleted in zirconium 91 content. Laser isotope separation processes have been proposed, but such processes are very expensive.

The use of photochemical reactions to separate carbon 12 and carbon 13 has been reported in detail by Turro and co-workers, for example in the publications: "Magnetic Field and Magnetic Isotope Effeccts in Organic Photochemical Reactions. A Novel Probe of Reaction Mechanisms and A Method for Enrichment of Magnetic Isotopes", Turro N. J. and Kraeutler, B., Acc. Chem. Res. 13 pp. 369–377 (1980); "Photoreactions in Detergent Solutions. Enhancement of Regioselectively Resulting from the Reduced Dimensionality of Substrates Sequestered in a Micelle", Turro, N. J. and Cherry, W. R., J. Am. Chem. Soc. 100 pp. 7431-32 (1978); and "Magnetic Isotope and Magnetic Field Effects on Chemical Reactions. Sunlight and Soap for the Efficient Separation of $^{13}C$ and $^{12}C$ Isotopes", Turro, N. J. and Kraeutler, B., J. Am. Chem. Soc. 100 pp. 7432-4 (1978).

The photolysis of dibenzyl ketone using sunlight or a mercury lamp excitation results in a quantitative yield of CO and 1,2 diphenylethane, as disclosed in "Photochemistry of Dibenzyl Ketone", Engel, P. S., J. Am. Chem. Soc. 92 pp. 6074-6 (1970). If dibenzyl ketone is irradiated in benzene to very high conversions (~99%), mass spectral analysis of the remaining fraction reveals that a small enrichment of $^{13}C$ has occurred. When dibenzyl ketone containing a natural abundance of $^{13}C$ is used, the effect is barely outside the experimental error. However, if synthetically enriched dibenzyl ketone is used, the measured enrichment is well outside the experimental error. The percent of $^{13}C$ enrichment is found to depend on the extent of conversion. When the sample initially contains 25.38% total $^{13}C$, at 45% conversion the present $^{13}C$ is 25.60% and at 85% photolytic conversion it is 26.88%. This calculates to a 5.6% net enrichment. A separation factor, $\alpha$, which compares the magnetic isotope effect and mass isotope effect on chemical reactivity is given by:

$$\alpha = \frac{\text{rate of disappearance of }^{12}C\text{ compound}}{\text{rate of disappearance of }^{13}C\text{ compound}}$$

As defined, $\alpha$ is a measure of the relative rate constants of the isotopic species for an irreversible rate-determining step which is independent of the extent of conversion. The reactivity rate constants in the photochemical conversion reactions differ for $^{13}C$ and $^{12}C$ since their nuclear magnetic moments differ.

The mechanism proposed for the dibenzyl ketone photochemical dissociation involves radical pair formation and surmises that $^{13}C$ and $^{12}C$ reaction rates should be dependent on the diffusion coefficients of the radical pair, nuclear hyperfine interactions, magnetic field interactions and electron exchange reactions. Diffusion coefficients are first-order dependent on solvent viscosity and are expected to show significant reaction rate effects. Photolysis of dibenzyl ketone at room temperature in solvents of increasing viscosity does result in corresponding increases in the value of $\alpha$. When the solvent is changed from benzene (viscosity=0.6 cP) to cyclohexanol (30 cP), $\alpha$ increases from 1.04 to 1.07. The magnitude of the effect is not large considering the very large increase in viscosity.

When dibenzyl ketone is photolyzed to high completion efficiency (90%) in aqueous detergent solutions containing micelles, $\alpha$ is increased dramatically. In 0.05 M hexadecyltrimethylammonium chloride, $\alpha$ values of 1.4 are obtained. Also, the value of $\alpha$ decreases to 1.0 in a very strong magnetic field ($10^4$ G). This vanishing of the magnetic isotope effect is due presumably because the strong field completely determines the rate of intersystem radical pair crossing.

In U.S. Pat. No. 4,389,292 which issued as a co-invention of one of the co-inventors herein, and which is assigned to the assignee of the present invention, and incorporated by reference herein, a chemical isotope separation process is described. That process involves initially the formation of a zirconium complex or chelate. When exposed to selected wavelength photons, the metal ligand bond may rupture and then reform. Analogous to the dibenzyl ketone scheme, the reforming rate is sensitive to the nuclear magnetic moment which is different for the odd and even zirconium nuclei. The photon excited states of the metal-ligand bond for even and odd zirconium isotopes are a singlet and triplet which drop back to the ground state at slightly different rates. If a scavenger, or second chelant or complexing ligand, is available to react with the excited metal-ligand molecule, then the product of this reaction would become enriched with the $^{91}Zr$ isotope since the triplet state is expected to remain in the excited state for a longer time.

An analysis of the chemical isotope separation proposed in U.S. Pat. No. 4,389,292 has provided a redefined $\alpha$ as the separation factor, which may be defined as:

$$\alpha = \left[ \frac{\frac{\text{Mole Fraction of Even Isotope in Heads Stream}}{1\text{-Mole Fraction of Even Isotope in Heads Stream}}}{\frac{\text{Mole Fraction of Even Isotope in Tails Stream}}{1\text{-Mole Fraction of Even Isotope in Tails Stream}}} \right.$$

We have now discovered that zirconium isotopes can be separated using certain ligands by photolysis in solutions, preferably in solutions containing a micellar detergent.

SUMMARY OF THE INVENTION

The separation of the zirconium 91 isotope from a mixture with other zirconium isotopes is carried out by forming a solution of a zirconium compound and a scavenger which reacts with the zirconium compound only when it is in an excited state. When the solution is irradiated with light having a wavelength between about 220–600 nm the molecules are excited by the light, but the molecules containing the zirconium 91 isotope remain in the excited state for a longer period of time than the molecules containing other zirconium isotopes. Thus, the molecules containing the zirconium 91 isotope react disproportionately with the scavenger, and therefore the reaction product, which precipitates, contains a disproportionate amount of the zirconium 91 isotope. Preferably, the solution contains micelles that enhance the isotopic separation, and the separation is carried out at ambient temperatures.

DETAILED DESCRIPTION

The zirconium compounds used in the present process are those which will provide absorption spectra at wavelengths which will cause their excitation and reaction with the scavenger. Examples of zirconium complexing agents which form zirconium compounds usable in the present invention include citric acid, tartaric acid, and beta diketones such as acetylacetone, dibenzoylmethane, benzoylacetone, trifluoroacetylacetone, and other beta diketones. Beta diketones are preferred because of their greater light absorption characteristics in the 200–600 nanometer region. Beta diketones ionize and the ions form a heterocyclic ring with the zirconium with the zirconium atom as a part of each ring, in the form of a coordination compound. For example, acetylacetone reacts with zirconium to form a chelate as follows:

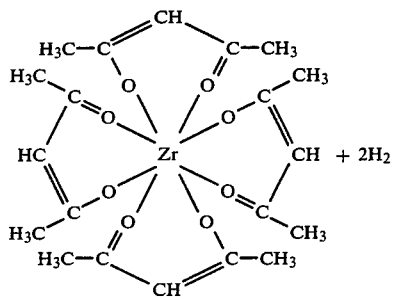

Especially useful beta diketones for formation of the zirconium chelates used in the present process are those beta diketones which have the formula:

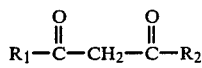

wherein $R_1$ and $R_2$ are lower alkyl radicals having 1–4 carbon atoms. A preferred zirconium chelate is that formed from the above formula wherein $R_1$ and $R_2$ are both methyl groups. These zirconium chelates, the zirconium tetra acetylacetonates, have been found to provide separation of zirconium 91 from its mixture with other zirconium isotopes, in solution at ambient temperatures.

The zirconium compound is prepared as a solution in a solvent which will dissolve both it and the scavenger, and which is transparent to light at the wavelength used to excite the zirconium compound. Examples of such solvents are benzene, toluene, xylene, cyclohexanol, normal alkanes having 5–8 carbon atoms, such as pentane, hexane, heptane and octane as well as mixtures thereof. While water is not suitable as a solvent, because of limited solubility, water which contains a micelle-forming agent is usable, as is an aqueous methanol solution where such micelle-forming agents are present.

While the solution may have any solids content up to the solubility of its components, a 1 to 20% solution is preferred because a more dilute solution gives too low a yield, and light sources are not available to handle more concentrated solutions.

The addition of a micelle-forming agent to the solution, in addition to rendering water and aqueous methanol solutions usable in the present invention, also enhances the separation of zirconium 91 from other zirconium isotopes, when using other solvents, according to the present process. The micelle-forming agent may be generally classified as a detergent. Examples of suitable micelle-forming agents include soldium dodecyl sulfate, ethoxylated fatty alcohols, and quaternary ammonium salts containing a $C_{12}$ to $C_{18}$ straight chain group. The preferred micelle-forming agent is hexadecyltrimethylammonium chloride because of its solubility in most organic solvents used in this invention. The micelle-forming agent is added to the solution in an amount to enhance the separation of the zirconium 91 isotope without adversely effecting the solubility of the compounds, separation of the reaction product formed, or the transparency of the solution to light at the wavelength used for excitation of the zirconium 91 isotope. A suitable amount is about 0.025 to about 0.10% by weight. The viscosity of the solvent also has an effect on the separation process, with higher viscosities preferred, provided the viscosity is not so high as to interfere with the solubility of the reactants, the photochemical chemical reaction, or separation of the reaction product from the solution.

The light source used to excite the zirconium compound in the solution may comprise sunlight, or light from a laser that will produce light at a wavelength that will excite the compound containing the zirconium. The wavelength of light used in the present process should be within the range of between 220–600 nm. The amount of light is controlled so as to maximize the separation of the zirconium 91 isotope from the other isotopes. That is, if too little light is used very little reaction of the zirconium compound with the scavenger will occur and $\alpha$ will be small. On the other hand, if too much light is used molecules containing other isotopes of zirconium will also react with the scavenger and $\alpha$ will again be small. The maximization of $\alpha$ requires an intermediate amount of light, which can be determined experimentally for the particular zirconium compounds, solvents, and scavengers being used. About 5 to about 30 minutes is generally suitable. The amount of scavenger is not critical, but preferably is from about a mole ratio of about 1:1 to about 1:3 zirconium compound to 8-hydroxyquinoline.

The excitation of the zirconium compound is carried out in solution in the presence of a scavenger that will form a reaction product with that excited molecules, such that the reaction product separates from the solution of other zirconium chelates, preferably by precipitating. The only scavenger which has been found to work successfully in this invention is 8-hydroxyquinoline ("oxine") and its derivative, such as chloro, bromo, fluoro, and hydroxy. We have found 8-hydroxyquinoline itself to be an especially useful scavenger in combination with zirconium tetraacetylacetonate. The major reaction which occurs when zirconium tetraacetylacetonate [Zr (acac)$_4$] and 8-hydroxyquinoline (8QOH) are mixed has been characterized by Brainina, E. M., et al. in "A New Class of Cyclopentadienyl Compound of Zirconium Containing Chelate-Forming Groups", Dok. Akad, Nauk SSR, 169, No. 2 pp. 335-338 (1966). The reaction may be schematically written as:

$$Zr(acac)_4 + 3(8QOH) \rightarrow Zr\ acac\ (8QOH)_3 + 3H\ acac$$

Acetylacetone and 8-hydroxyquinoline have simmilar donor properties with zirconium (IV) so that photochemically induced exchange reactions proceed slowly. Prolonged refluxing of the reactants in benzene will lead to exchange and eventual precipitation of the mixed complex. In the present process, the exchange reaction is controlled using photochemical excitation to effect separation of the zirconium 91 isotope.

The present process is preferably carried out at ambient temperatures, which enables easy and efficient operation of the process, and separation of the reaction product from the solution, with various separations such as precipitation and filtration, used to separate the zirconium 91 reaction product.

The following examples further illustrate the present process, wherein amounts are by weight, unless otherwise indicated. In the tables used in the examples, the $\alpha$ referred to is the redefined $\alpha$ described on page 4 of the present specification; while 91/90 refers to the atom ratio of 91 zirconium to 90 zirconium, and the percent 91 zirconium is derived therefrom.

EXAMPLE I

A series of examples were made wherein a solution of zirconium (acac)$_4$ and 8-hydroxyquinoline were subjected to light from a laser. A first solution was prepared by dissolving 5.00 g (0.010 mole) of zirconium acetylacetonate [Zr (acac)$_4$] in 100 ml of benzene and mixing with 1.48 g (0.010 mole) of 8-hydroxyquinoline [8QOH] in 20 ml benzene. A bright yellow color developed immediately. The solution had an absorption maximum of 385 nm and was stable after two weeks in darkness. An aliquot (Run 1) of the solution (40 ml) was irradiated in a quartz container using the 488 nm line of an argon ion laser. Total power in this line was about 3.5 watts. This aliquot was irradiated for 30 minutes and then sealed in darkness overnight. A dark yellow solid and brownish filtrate resulted. These were separated by decanting and filtering, and the filtrate was evaporated to dryness at 90° C. The mass spectrometric results on the precipitate and filtrate are listed in Table I.

A second aliquot (Run 2) as irradiated as was Run 1, but for a 45 minute time period and treated as above. The results are also listed in Table I.

A second solution was prepared as was the first solution. Three aliquots were taken (40 ml) and were irradiated using the 458 nm line of an argon ion laser. Power output for this line was about 1.5 watts. One aliquot (Run 3) was irradiated for 15 minutes, a second aliquot (Run 4) for 30 minutes, and the third aliquot (Run 5) for 60 minutes. A noticeable increase in color was noted for the precipitates and filtrates for each of these samples relative to Runs 1 and 2. The precipitates and filtrates were treated as above. The analysis of the same are listed in Table I.

TABLE I

| Run No. | 91/90 Precipitate | 91/90 Filtrate | % 91 Precipitate | % 91 Filtrate | α |
|---|---|---|---|---|---|
| 1 | 0.21863 | lost | 11.25 | lost | — |
| 2 | 0.21861 | 0.21870 | 11.25 | 11.25 | 0.999 |
| 3 | 0.21884 | 0.21857 | 11.26 | 11.25 | 1.001 |
| 4 | 0.21857 | 0.21871 | 11.25 | 11.25 | 0.999 |
| 5 | 0.21873 | 0.21871 | 11.25 | 11.25 | 0.993 |

These runs, using a laser, did not produce appreciable enrichment of the zirconium 91 in the precipitate. However, the use of sunlight, with a micelle solution in benzene was run, Run No. 6, as follows.

A first solution was prepared containing 5.00 g (0.10 mole) of Zr (acac)$_4$ in 100 ml benzene, and was made 0.50 with hexadecyltrimethyl ammonium chloride (HDTCL). A second solution was prepared containing 1.48 g (0.010 mole) 8QOH and 0.050M HDTCL in 20 ml benzene. The two solutions were combined. A first such solution, Run 11, was placed on a window sill. After 2 days, some cloudiness was noted but insignificant precipitation occurred. After one week, a small amount of solid was recoverable with centrifuging. Analysis of the filtrate and precipitate are listed in Table II. A second such solution was stored in total darkness over this same time period remainded clear.

TABLE II

| Run No. | 91/90 Precipitate | 91/90 Filtrate | % 91 Precipitate | % 91 Filtrate | α |
|---|---|---|---|---|---|
| 6 | 0.21932 | 0.21600 | 11.28 | 11.13 | 1.020 |

EXAMPLE II

A series of examples were run to show the effect of solvent viscosity. A solution was prepared as in Runs 1-5 of Example I, except that cyclohexanol (viscosity of 30 cp) was used as the solvent in place of benzene (viscosity of 0.6 cp). Three aliquots were taken, which were irradiated at 488 nm using the laser used in Example I. Run 7 was irradiated for 15 minutes; Run 8 was irradiated for 30 minutes; and Run 9 was irradiated for 45 minutes. The precipitates and filtrates were treated as in Example I and the results of analyses thereof listed in Table III.

TABLE III

| Run No. | 91/90 Precipitate | 91/90 Filtrate | % 91 Precipitate | % 91 Filtrate | α |
|---|---|---|---|---|---|
| 7 | 0.21997 | 0.21553 | 11.31 | 11.11 | 1.021 |
| 8 | 0.21879 | 0.21888 | 11.26 | 11.26 | 0.999 |
| 9 | 0.21877 | 0.21849 | 11.25 | 11.24 | 1.001 |

The precipitate shows a small enrichment of zirconium 91, while the filtrate shows a corresponding depletion of this isotope. Irradiation at the longer times, Runs 8 and 9, results in near completion of the chelate exchange reaction and the isotope effect vanishes.

EXAMPLE III

A series of examples were run using a micelle solution. The solution was prepared as in Runs 1-5 of Example 1, except that methanol was used as the solvent and the solution was made 0.050M in hexadecyltrimethylammonium chloride (HDTCL). A yellow color developed on mixing the solutions. The absorption spectrum was the same as in the benzene solvent. Three aliquots were taken which were each irradiated at 488 nm using the laser used in Example I. One aliquot was irradiated for 15 minutes. No significant change occurred and no precipitate formed after one week storage in darkness. A second aliquot (Run 10) was irradiated for 30 minutes. Significant solid appeared on overnight standing in the darkness. The analysis of the precipitate and filtrate are listed in Table IV. A third aliquot (Run 11) was irradiated for 60 minutes. The analyses of the precipitate and filtrate are also listed in Table IV.

TABLE IV

| Run No. | 91/90 Precipitate | 91/90 Filtrate | % 91 Precipitate | % 91 Filtrate | α |
|---|---|---|---|---|---|
| 10 | 0.22286 | 0.21438 | 11.44 | 11.05 | 1.051 |
| 11 | 0.22136 | 0.21588 | 11.37 | 11.12 | 1.033 |

EXAMPLE IV

The use of sunlight on a water-micelle solution was evidenced for separation of zirconium isotopes by mixing together saturated solutions of Zr (acac)$_4$ (and 8QOH, each of which contained the reactants in 100 ml of deionized water and 0.050M HDTCL. Prior to mixing, the two solutions were initially allowed to stand overnight to ensure that no settling or cloudiness occurred. The two solutions were combined after two days. Analysis of the precipitate and the filtrate (Run No. 12) are listed in Table V.

In a further run (Run No. 13), the above procedure, of Run No. 12, was repeated except that a 75/25 methanol:water mixture, by volume, was used instead of water alone, and the mixture was exposed to sunlight for a period of 36 hours. The results of analysis of the precipitate and filtrate are also listed in Table V:

TABLE V

| Run No. | 91/90 Precipitate | 91/90 Filtrate | % 91 Precipitate | % 91 Filtrate | α |
|---|---|---|---|---|---|
| 12 | 0.22317 | 0.21407 | 11.46 | 11.04 | 1.055 |
| 13 | 0.21997 | 0.21727 | 11.31 | 11.19 | 1.016 |

The present process provides for the separation of the zirconium 91 isotope from other zirconium isotopes in a mixture and with the use of zirconium tetraacetylacetonate and 8-hydroxyquinoline, a 2–3 percent by weight enrichment of the zirconium 91 isotope in a precipitate, with a corresponding depletion of zirconium 91 in the starting solution, is effected in a single stage separation.

EXAMPLE V

A series of experiments were run as described in Example III except that sulfate ion, chloride ion, and oxalate ion were substituted for 8-hydroxyquinoline in the reaction scheme. Solutions of sulfate, chloride, and oxalate were made equimolar with zirconium as described in Example I. Laser irradiation at 488 nm for similar times as for 8-hydroxy quinoline produced the following results:

TABLE VI

| Run No. | Additive | % 91 Precipitate | % 91 Filtrate | α |
|---|---|---|---|---|
| 14 | Chloride | 11.16 | 11.16 | 1.000 |
| 15 | Sulfate | 11.16 | 11.15 | 1.001 |
| 16 | Oxalate | 11.16 | 11.16 | 1.000 |

No significant $^{91}$Zr separation was achieved using these reactants as is indicated by the above mass spectrometric results.

EXAMPLE VI

Example III was repeated using chelates other than Zr (acac)$_4$. Table VII gives the results:

TABLE VII

| Run No. | Additive | % 91 Precipitate | % 91 Filtrate | α |
|---|---|---|---|---|
| 16 | Dibenzoylmethane | 11.33 | 11.17 | 1.014 |
| 17 | Benzoylacetone | 11.38 | 11.11 | 1.024 |
| 18 | Trifluoroacetylacetone | 11.29 | 11.18 | 1.010 |

What is claimed is:

1. A process for reducing the zirconium 91 isotopic content of zirconium comprising:
   (A) forming a solution which comprises:
      (1) a solvent;
      (2) a scavenger selected from the group consisting of 8-hydroxyquinoline, derivatives of 8-hydroxyquinoline, and mixtures thereof;
      (3) a compound containing zirconium which is soluble in said solution and which reacts with said scavenger when exposed to light having a wavelength of about 220 to about 600 nm;
   (B) irradiating said solution with light having a wavelength of about 220 to about 600 nm for a time selected to photoreact a disproportionate amount of said compound containing said zirconium 91 isotope with said scavenger; and
   (C) separating the product of said reaction from said solution.

2. A process according to claim 1 wherein said compound of zirconium is a chelate formed from a beta diketone.

3. A process according to claim 2 wherein said beta diketone has the general formula:

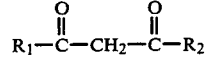

wherein R$_1$ and R$_2$ are each independently selected from alkyl having 1 to 4 carbon atoms.

4. A process containing to claim 3 wherein R$_1$ and R$_2$ are methyl groups.

5. A process according to claim 1 wherein said scavenger is 8-hydroxyquinoline.

6. A process according to claim 1 wherein said solvent is selected from the group consisting of benzene, toluene, xylene, cyclohexanol, normal alkanes having 5 to 8 carbon atoms, and mixtures thereof.

7. A process according to claim 1 wherein said solution includes a micelle-forming agent.

8. A process according to claim 7 wherein said solvent is selected from the group consisting of water and aqueous methanol.

9. A process according to claim 1 wherein said irradiating is effected at ambient temperatures.

10. A process according to claim 1 wherein said compound of zirconium is zirconium tetraacetylacetonate and said scavenger is 8-hydroxyquinoline.

11. A process according to claim 1 wherein said separation is by precipitation and filtration of said product of reaction.

12. A process for reducing the zirconium 91 isotopic content of zirconium comprising:
   (A) forming a solution which comprises:

(1) 80 to 99% of a solvent;
(2) a beta diketone which has the general formula

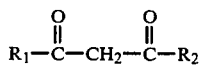

wherein $R_1$ and $R_2$ are each independently selected from alkyl having 1 to 4 carbon atoms;
(3) a scavenger selected from the group consisting of 8-hydroxyquinoline, derivatives of 8-hydroxyquinoline, and mixtures thereof;

(B) irradiating said solution with light having a wavelength of about 220 to about 600 nm for about 5 to about 30 minutes; and (C) separating the product of said reaction from said solution.

13. A process according to claim 13 wherein $R_1$ and $R_2$ are methyl groups.

14. A process according to claim 12 wherein said scavenger is 8-hydroxyquinoline.

15. A process according to claim 12 wherein said solvent is selected from the group consisting of benzene, toluene, xylene, cyclohexanol, and normal alkanes having 5-8 carbon atoms and mixtures thereof.

16. A process according to claim 15 wherein said solution includes a micelle-forming agent.

17. A process according to claim 16 wherein said solvent is selected from the group consisting of water and aqueous methanol.

* * * * *